2 Sheets—Sheet 1.

J. MILLS & J. MILLS, Jr.
Dumping-Wagon.

No. 218,999. Patented Aug. 26, 1879.

Witnesses
William J. Cooper.
Harry Smith

Inventors
James Mills
and
John Mills Jr.
by their Attorneys
Howson Son

2 Sheets—Sheet 2.
J. MILLS & J. MILLS, Jr.
Dumping-Wagon.
No. 218,999. Patented Aug. 26, 1879.
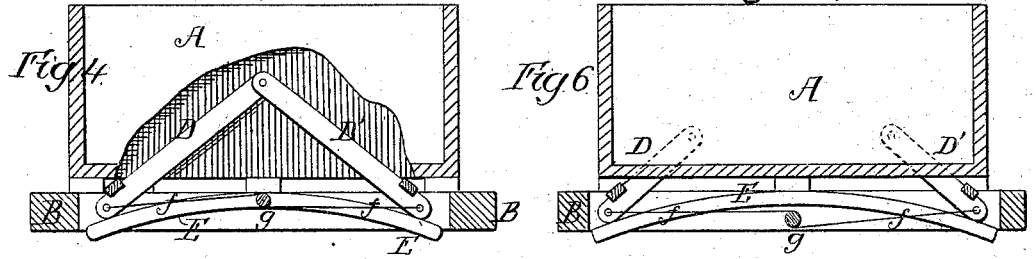
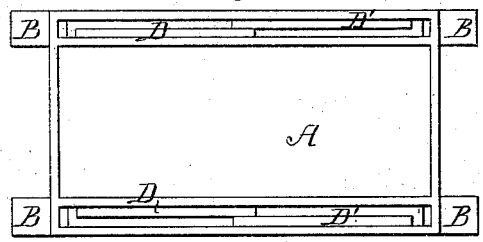
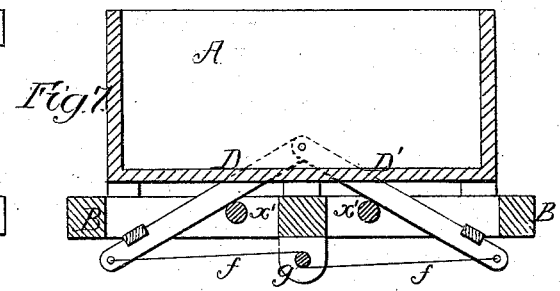
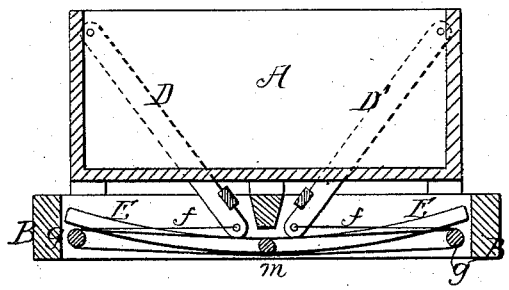
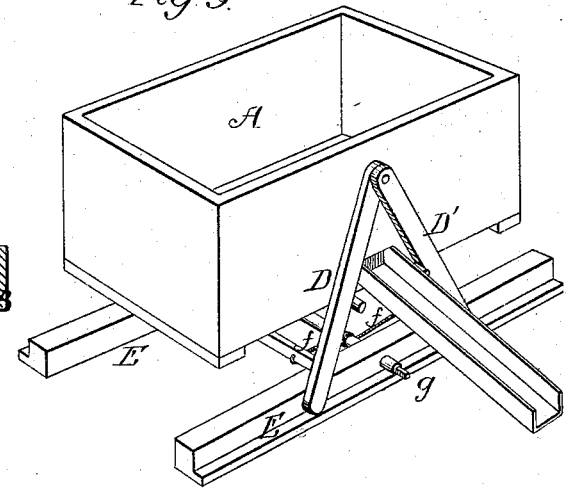
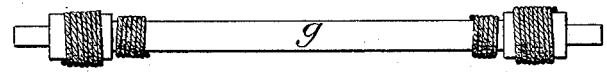
Witnesses
William J. Cooper.
Harry Smith
Inventors
James Mills
and
John Mills Jr.
by their Attorneys
Howson Austin

UNITED STATES PATENT OFFICE.

JAMES MILLS AND JOHN MILLS, JR., OF WILMINGTON, DELAWARE.

IMPROVEMENT IN DUMPING-WAGONS.

Specification forming part of Letters Patent No. 218,999, dated August 26, 1879; application filed June 2, 1879.

*To all whom it may concern:*

Be it known that we, JAMES MILLS and JOHN MILLS, Jr., of Wilmington, Delaware, have invented a new and useful Improvement in Dumping Carts or Wagons, of which the following is a specification.

The object of our invention is to so combine the frame and body of a cart with certain arms and mechanism for operating the same that the body may be readily elevated above the ground to an extent which will permit the use of a steep discharge-chute, down which the coal or other contents of the body can descend freely and rapidly to its destination.

This object we attain in the manner which we will now proceed to describe, reference being had to the accompanying drawings, in which—

Figure 1:
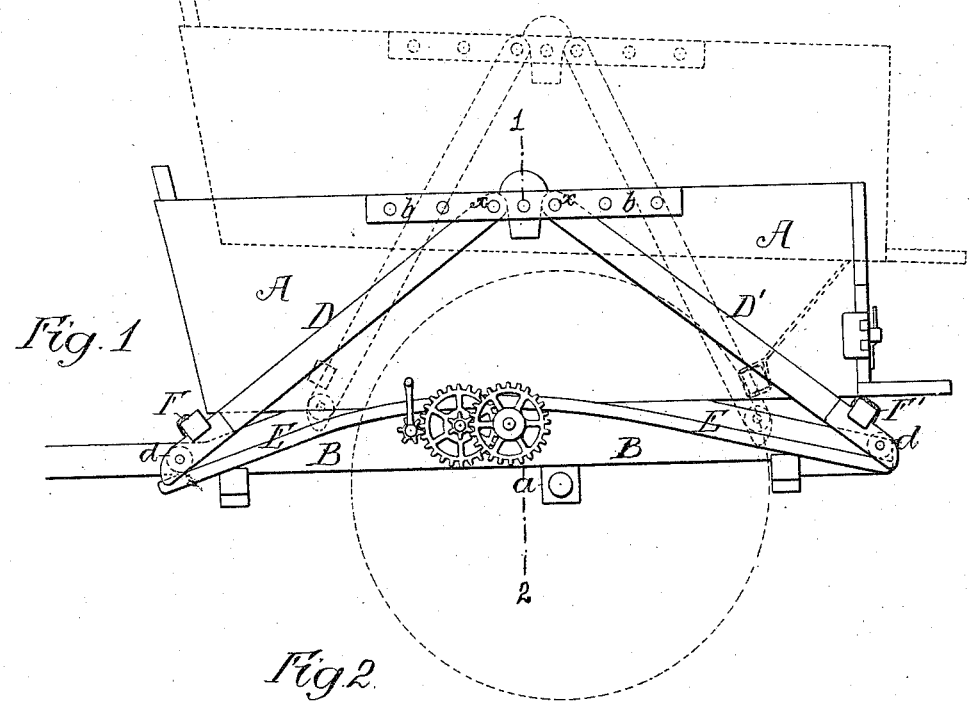
Figure 2:
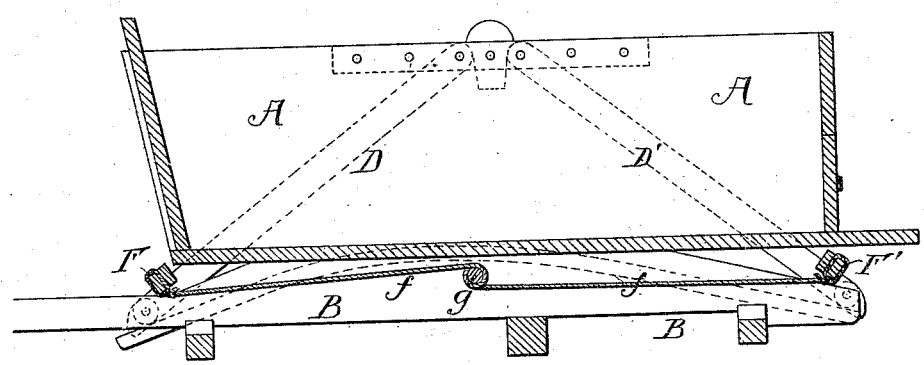
Figure 3:
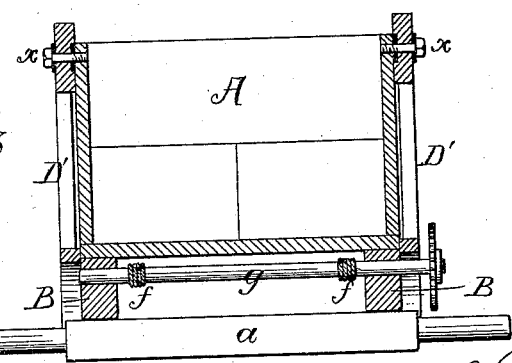

Figure 1, Sheet 1, is a side view of part of a cart with our improvements, the wheels of the cart being shown by dotted lines; Fig. 2, a longitudinal section of Fig. 1; Fig. 3, a transverse section on the line 1 2; and Figs. 4 to 10, Sheet 2, views illustrating different modifications of our invention.

In Figs. 1 and 2, A represents the box or body of the cart, and B the frame, the latter being provided with suitable shafts, and having, in the present instance, a single axle, $a$, provided with the usual wheels. The body A, when depressed, rests on the frame B, but when elevated is supported by arms D D', two on each side of the said body. The upper ends of each pair of arms are pivoted to the wagon-body at $x$ $x$, and to a strip, $b$, secured thereto, and the lower ends of the arms carry anti-friction rollers $d$, which are adapted to curved rails E, secured to the frame, one at each side of the same.

A transverse bar, F, connects the opposite arms D together, the arms D' being connected together by a similar cross-bar, F', and to these transverse bars are attached the outer ends of ropes or chains $f$, the inner ends of which are wound round a shaft, $g$, having its bearings in the frame B, suitable gearing—such, for instance, as that shown in Fig. 1—being used as a medium through which the shaft is operated by an appropriate handle.

In transporting the load, the body A rests upon the frame B, and the arms D D' are in the positions shown by full lines in Fig. 1; but when the cart has arrived at its destination and the load has to be discharged, the shaft $g$ is turned so as to wind up the chains or ropes $f$, and cause the lower ends of the arms D D' to move toward each other, the rollers on the arms traversing the tracks or rails E, and the body of the cart being consequently so far elevated that a comparatively steep chute may be used for directing the coal from the body to a cellar-opening.

After the load has been discharged, the shaft $g$ is turned so as to unwind the cords or chains $f$, and permit the body A to descend by its own weight to its bearings on the frame.

The arms D D' may be combined with the body A and bed B in different ways. Thus, in Figs. 4 and 5, we have shown a cart each side of the body of which is double, so as to form a space for the reception of the arms. In this case also both arms D D' are connected to the same pin on the body, and this pin is located at a point about midway between the top and bottom of the body, and the ropes or chains $f$ are connected directly to the lower ends of the arms D D', instead of to transverse beams on said arms.

In Fig. 6 the arms D D' are arranged near the opposite ends of the body, and in Fig. 7 the rails E are dispensed with, the arms D D' resting and sliding upon anti-friction rollers $x'$, carried by the bed B.

In Fig. 8 the arms D D' are inclined in a direction the reverse of that shown in the other figures, and the lower ends of the arms are moved away from instead of toward each other, in order to raise the body A. In this case also two winding-shafts, $g$, are used, these shafts being located at the opposite ends of the cart, and one shaft operating the arms D, while the other operates the arms D'.

The shafts $g$ $g$ may be operated independently of each other; but we prefer to operate them in unison from a central shaft, $m$, by means of chains or suitable gearing.

By the use of the arms D D' we can elevate the body A to such an extent as to impart the proper inclination to a chute extending completely across a sidewalk from the curb to the house, so that the cart can be made with the discharge-opening on the side, if desired, as shown in Fig. 9, thereby overcoming the necessity of turning the cart at right angles to the curb and backing the body of the cart over the sidewalk.

When the body of the cart is hung to the arms in the manner shown in Figs. 4, 7, &c., the body may be tilted independently of the arms; or, if it is desired to effect the tilting of the body at the same time that it is elevated, the arms D may be made longer than the arms D'; or the rails E may have such a conformation as would effect the raising of the arms D to a greater extent than the arms D'; or the portions of the winding shaft or drum $g$ which receive the cords or chains $f$ of the arms D may be greater in diameter than the portion which receives the cords of the arms D', as shown in Fig. 10.

Although we have described rails $e$ or rolls $x$ as forming the supports for the arms D D', it is not absolutely necessary that the supports should be thus constructed. For instance, pins on the lower ends of the arms might be adapted to slots in the frame, if desired.

We claim as our invention—

1. The combination of the frame B of a wagon or cart, the body A of the same, two pairs of arms, D D', connected to the body at the upper ends, but free to move at the lower ends, supports for said arms, and devices for moving the lower ends of both pairs of arms from or toward each other, all substantially as set forth.

2. The combination of the body A, the frame or bed B, the arms D D', supports for said arms, a winding-shaft, $g$, adapted to bearings in the frame beneath the body, and cords or chains $f$, connecting the arms D D' to said winding-shaft, all substantially as set forth.

3. The combination of the body A, the bed or frame B, having rails E thereon, the arms D D', bearing on said rails, and devices for moving said arms toward or from each other, all substantially as described.

In testimony whereof we have signed our names to this specification in the presence of two subscribing witnesses.

JAMES MILLS.
JOHN MILLS, JR.

Witnesses:
   JAMES BARKLEY,
   ALVAN ALLEN.